(12) United States Patent
Park (10) Patent No.: US 8,840,345 B1
(45) Date of Patent: Sep. 23, 2014

(54) DEVICE FOR DRILLING POCKET HOLES

(75) Inventor: Joon Park, Glendale, CA (US)

(73) Assignee: Kreg Enterprises, Inc., Huxley, IA (US)

( * ) Notice: Subject to any disclaimer, the term of this patent is extended or adjusted under 35 U.S.C. 154(b) by 1052 days.

(21) Appl. No.: 12/317,546

(22) Filed: Dec. 23, 2008

Related U.S. Application Data (60) Provisional application No. 61/008,771, filed on Dec. 24, 2007.

(51) Int. Cl.
  *B23B 47/28* (2006.01)
(52) U.S. Cl.
  USPC ........... 408/115 R; 408/112; 408/97; 408/103
(58) Field of Classification Search
  USPC ......... 408/115 R, 110, 111, 112, 97, 103, 67; 269/32, 158
  See application file for complete search history.

(56) References Cited

U.S. PATENT DOCUMENTS

| | | | |
|---|---|---|---|
| 263,727 A * | 9/1882 | Olsen | 68/22 R |
| 343,215 A * | 6/1886 | White | 269/87.1 |
| 1,299,938 A * | 4/1919 | Hathaway | 82/1.3 |
| 1,590,643 A * | 6/1926 | Neuwelt | 408/112 |
| 2,454,372 A * | 11/1948 | Billeter | 408/241 R |
| 2,710,454 A * | 6/1955 | Kershaw | 33/669 |
| 2,843,167 A | 7/1958 | Ruston | |
| 2,881,644 A * | 4/1959 | Conner | 408/241 R |
| 3,301,102 A * | 1/1967 | De Lara | 408/72 R |
| 3,362,447 A * | 1/1968 | Elder, Jr | 408/109 |

(Continued)

OTHER PUBLICATIONS

Kreg Jig #R3: http://www.kregtool.com/productstimage_browser/index.php?PRODUCT_ID=32 (Dec. 23, 2008).

(Continued)

*Primary Examiner* — Eric A Gates
*Assistant Examiner* — Paul M Janeski
(74) *Attorney, Agent, or Firm* — Zarley Law Firm, P.L.C.

(57) ABSTRACT

A device for drilling pocket holes may include a guide carrier having a front surface urging a workpiece; at least one slant bore disposed at the guide carrier for receiving a drill bit; an anti-skid structure disposed at the front surface to secure the workpiece; a drill bit carrier reciprocally and slidably mounted on the guide carrier from a pre-drilling position to a post-drilled position toward and away from the guide carrier and a drill bit rotatably coupled and retained therein; a clamp disposed at the base and an amplifier to actuate the clamp for clamping or unclamping the workpiece by a user's power, wherein the amplifier is disposed away from the base; a quick positioning of the clamp by a braking lever; a lateral stop disposed at the clamp to set a lateral position of the pocket hole from a side face of workpiece; an adjustable end stop disposed at the guide structure or the guide carrier to adjust a pocket hole distance from an end face of workpiece; a lateral through opening disposed at the guide carrier and connected to the slant bore to remove waste material generated from workpiece drilling; a sensor disposed in a waste material remover to activate a blower when a drill motor driving the drill bit is turned on; the slant bore whose diameter is at least 7/16 inch to receive a corresponding pocket drill bit; a shank of the drill bit adapted to engage with a quick-change adapter; and a portion of pocket drill bit made of more wear-resistant material than that of the shank.

23 Claims, 7 Drawing Sheets

(56) References Cited

U.S. PATENT DOCUMENTS

| | | | | |
|---|---|---|---|---|
| 3,626,513 | A * | 12/1971 | Pytlak | 408/115 R |
| 3,635,571 | A * | 1/1972 | Roberts et al. | 408/97 |
| 3,738,766 | A * | 6/1973 | Elder, Jr. | 408/109 |
| 3,833,313 | A * | 9/1974 | Gallion | 408/112 |
| 3,927,872 | A * | 12/1975 | Sessody | 269/32 |
| 4,130,372 | A * | 12/1978 | Vugrin | 408/72 R |
| 4,132,496 | A * | 1/1979 | Casto | 408/112 |
| 4,331,411 | A * | 5/1982 | Kessinger et al. | 408/97 |
| 4,773,636 | A * | 9/1988 | Takahashi | 269/32 |
| 4,836,720 | A * | 6/1989 | Hadden | 408/112 |
| 4,874,156 | A * | 10/1989 | Goldzweig | 269/158 |
| 4,893,970 | A * | 1/1990 | Becraft | 408/72 R |
| 4,926,722 | A | 5/1990 | Sorensen et al. | |
| 5,676,500 | A | 10/1997 | Sommerfeld | |
| 5,791,835 | A | 8/1998 | Chiang et al. | |
| 5,797,708 | A * | 8/1998 | Bencic | 408/112 |
| 6,481,937 | B1 | 11/2002 | Sommerfeld et al. | |
| 6,511,265 | B1 * | 1/2003 | Mirchandani et al. | 407/53 |
| 6,599,064 | B1 * | 7/2003 | Robinson | 408/110 |
| 6,615,930 | B2 * | 9/2003 | Bongers-Ambrosius et al. | 173/198 |
| 6,637,988 | B1 | 10/2003 | Park | |
| 6,726,411 | B2 * | 4/2004 | Sommerfeld et al. | 408/1 R |
| 7,001,121 | B2 * | 2/2006 | Kamphuis et al. | 409/132 |
| 7,134,814 | B1 | 11/2006 | Park | |
| 7,374,373 | B1 * | 5/2008 | Park | 408/12 |
| 7,597,513 | B2 | 10/2009 | Chiang | |
| 2005/0089381 | A1 | 4/2005 | Liu et al. | |
| 2006/0228180 | A1 | 10/2006 | Sommerfeld et al. | |
| 2007/0280795 | A1 | 12/2007 | McDaniel et al. | |
| 2007/0280796 | A1 | 12/2007 | McDaniel et al. | |
| 2007/0280797 | A1 | 12/2007 | McDaniel et al. | |
| 2008/0099101 | A1 * | 5/2008 | Chiang | 144/2.1 |

OTHER PUBLICATIONS

Kreg Jig #k200 Manual: http://kregtool.com/information_center/manualsK_SeriesManual.pdf (Dec. 23, 2008).

* cited by examiner

PRIOR ART

DEVICE FOR DRILLING POCKET HOLES

CROSS REFERENCE TO RELATED APPLICATION

This application fully incorporates by reference the contents of U.S. Provisional Application No. 61/008,771 entitled "DEVICE FOR DRILLING POCKET HOLES" filed Dec. 24, 2007

FIELD

This invention is directed to a device that permits holding and drilling pocket holes into a first workpiece.

BACKGROUND

Two wood workpieces can be fastened together by means of a pocket joint. A pocket joint comprises a pocket hole drilled in a first workpiece at a slant angle to the face of the first workpiece and exiting out of an end face. A second workpiece is then clamped into position in the same plane, abutting the end of the first workpiece adjacent the pocket hole. A screw is then inserted into the pocket hole of the first workpiece and driven into the second workpiece to thereby fasten the second workpiece and first workpiece.

In the prior art, typical jigs provide a drill guide carrier including a first drill guide bushing. In operation, a drill is inserted into the first drill guide bushing and then drilling a first pocket hole. The user then removes the drill from the first drill guide bushing and inserts the drill bit into a second bushing to drill a second parallel pocket hole. The drill is then removed from the second drill guide bushing. The repeating insertion and removal sequences, that may also involve clamping and reclamping the workpiece, are not only time consuming, but also result in dulling and damaging the cutting edge of the drill bit resulting in accelerated drill bit wear due in part to the user's error in slightly misaligning the drill bit with respect to the guide bushings as it is inserted and removed.

There are various methods for clamping the workpiece in a pocket hole drilling jig. Generally, there are two clamping surfaces or jaws that may be tightened by the user to hold the workpiece in the desired position. The actuator for tightening the clamping surfaces may be mechanical or pneumatic. For example, a pneumatic foot switch actuator may be provided for controlling delivery of compressed air to a cylinder that houses a piston to which one of the clamps is attached. This foot operation provides convenience and speed but requires that the user has a supply of compressed air usually requiring a noisy air compressor. Moreover, clamping relatively thick and thin workpieces in the jig with a short stroke pneumatic cylinder requires an additional extension plate for the thinner workpieces, otherwise the jig needs a long base lengthwise to accommodate a long stroke pneumatic cylinder thereon.

Two examples of pocket hole drilling devices with a drill bit that is retained in a drill bit guide carrier are disclosed in U.S. Pat. No. 6,599,064 to Robinson. A drill chuck in such device holds the drill bit; the chuck is rotably coupled to and axially retained in the drill bit guide carrier that is reciprocating and is guided by a retaining structure. The placement of the drill chuck in between the drill bit and the drill bit carrier requires an unnecessary axial space of obstruction that either limits the stroke of the drill bit as will be described or requires a lengthy apparatus in a drilling direction as shown in the Robinson patent.

The maximum size screw used in pocket holes for joining structural lumbers (2×4-38.1 mm×88.9 mm, 2×6-38.1 mm×139.7 mm and so on) is a #8. Joining structural lumbers assemblies that are subject to a high load may require use of larger diameter screws, which demands use of corresponding pocket drill bits and jig.

For the reasons stated above, and for other reasons stated below which will become apparent to those skilled in the art upon reading and understanding the present specification, there is a need in the art for an improved device for pocket hole drilling.

SUMMARY

A device for drilling pocket holes in a workpiece (hereinafter "drilling device") comprising, in one embodiment, a drill guide carrier having a front surface against which a workpiece may be clamped, a base, a drill bit holder slidably and reciprocally mounted on the drill guide carrier for movement in a drilling direction from a pre-drilling position to a post-drilled position toward and away from the guide carrier, at least one opening disposed in the drill bit holder so that a drill bit is rotatably coupled to and axially retained in the opening. In another embodiment, the drilling device further comprises upright members mounted on the base on which the guide carrier is slidably movable so that the device can accommodate different thickness workpieces to permit drilling a pocket hole at various locations. In another embodiment, the drill bit holder is returned to the pre-drilling position by frictional means or spring bias. In still another embodiment, the drilling device further comprises a guide structure that is selectively positionable with respect to an end face of the workpiece, anti-skid pins disposed on the front surface of the drill guide carrier, a clamp body including a clamping surface, and a handle mounted on the opposite side of the front surface so as to move the clamp body toward the drill guide carrier so as to clamp the workpiece during drilling the workpiece.

In another embodiment of a drilling device comprising a drill guide carrier having a front surface adapted to engage a workpiece, at least one bore disposed in the drill guide carrier for receiving a drill bit, and at least one anti-skid structure disposed on the front surface so as to prevent the workpiece from inadvertent movement during drilling. The provision of the anti-skid structures together with a force exerted by a user allows for successfully drilling the workpiece, without clamping and unclamping the workpiece. The anti-skid structure maybe comprise thermoplastic elastomeric material, frictional material including sandpaper, knurled metal, apex pin, cone point screw or combinations thereof.

Another embodiment of a drilling device comprising a drill guide carrier having a front surface for contacting a workpiece, at least one slant bore disposed in the guide carrier for receiving a drill bit, two rigid bars horizontally and independently disposed on the base for supporting a clamp body for slidable movement in a longitudinal direction, guide structure mounted on the base for vertically, slidably supporting the guide carrier, the guide structure having indicia indicating the workpiece thickness disposed on at least one of the guide carrier or the guide structure. In yet another embodiment, the drilling device is a portable unit and can be used by clamping on the workpiece that may be stationary, the device comprising at least one anti-skid structure disposed on the front surface of a drill guide carrier and a handle disposed at an opposite side from the front surface that may be operated so as to clamp the guide in position.

Another embodiment of the drilling device comprises a base, a guide carrier disposed on the base and having a front surface for contacting a workpiece, a clamp disposed on the base, an amplifier disposed away from the base to actuate the clamp for clamping or unclamping the workpiece, the clamping force being controlled by the user's power. In one embodiment, the amplifier is a foot pedal actuator and the drilling device further comprises a guide carrier having a front surface for contacting a workpiece, a drill bit holder slidably and reciprocally mounted on the guide carrier for movement in a drilling direction from a pre-drilling position to a post-drilled position toward and away from the guide carrier while the drill bit is retained in the drill guide carrier and the drill bit holder.

Another embodiment of a drilling device comprising a base, a drill guide carrier disposed on the base having a front surface for contacting a workpiece, a clamp body disposed on the base for clamping the workpiece and a quick positioning brake lever for the clamp that may be used in conjunction with a foot operated amplifier positioned away from the base or with a hand operated clamping handle.

Another drilling device embodiment comprising a drill guide carrier having a front surface contacting a workpiece, at least one slant bore disposed on the drill guide carrier for receiving a drill bit, and a lateral opening disposed in the guide carrier and connected to the slant bore to remove waste generated from workpiece drilling.

Another drilling device embodiment comprising a drill guide carrier having a front surface adapted to engage a workpiece, at least one slant bore disposed in the drill guide carrier for receiving a drill bit, the drill bit comprising a step drill, a shank and a pocket drill disposed between said step drill and shank, the diameter of the pocket drill being at least 7/16 inch (11.1 mm). In a variation of this embodiment, at least one of the step drill and the pocket drill being made of more wear resistant material, such as tungsten carbide, than that of the shank.

Another embodiment of a drilling device comprising a drill guide carrier having a front surface for contacting a workpiece, at least one slant bore disposed in the guide carrier, a drill bit disposed in the slant bore for drilling the workpiece, the drill bit comprising a step drill, a shank and a pocket drill formed between the shank and the step drill, and a non-circular cross section formed in the shank for receiving and engaging a quick-change adapter. In one other embodiment, the shank is hex-shaped having an annular groove adapted to engage a quick-change adapter having one or more balls disposed therein for engaging the shank annular groove.

Another drilling device embodiment comprising a drill guide carrier having a front surface adapted to engage a workpiece, at least one slant bore disposed in the drill guide carrier for receiving a drill bit, a lateral opening connected to the slant bore to remove waste material generated from workpiece drilling, a waste material remover connected to the opening by a hose to a vacuum source, and a sensor disposed in the waste material remover to activate the vacuum source when a drill motor driving the drill bit is turned on. The activation of the source may be caused by current, vibration, voltage or airflow rate changes.

Still another drilling device embodiment comprising a drill guide carrier having a front surface adapted to engage a workpiece, a guide structure movably mounted on the base in a longitudinal direction, a retaining structure pivotally mounted on the guide structure, a drill bit carrier reciprocally mounted on the retaining structure kept at a pre-drilling position and movable to a post-drilled position toward and away from the guide structure, and at least one drill bit disposed in said drill bit carrier is provided. In one embodiment, the drilling device further comprises at least one anti-skid structure to secure the device on the workpiece during drilling the workpiece. In another embodiment, the drilling device comprises at a clamping structure to secure the device on the workpiece. In still another embodiment, the drilling device comprises an adjustable lateral stop structure to position the drilling device with respect to the workpiece.

DETAILED DESCRIPTION OF THE EXEMPLARY EMBODIMENTS

In the following detailed description of the preferred embodiments, reference is made to the accompanying drawings which form a part hereof, and in which are shown by way of illustration specific preferred embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

Figure 1:
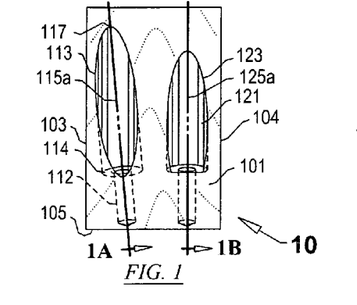
FIG. 1 is a front view of a workpiece 10 showing two pocket holes drilled adjacent each other, wherein an axis 115a is not perpendicular and an axis 125a is perpendicular to an end face 105.
Figure 1A:
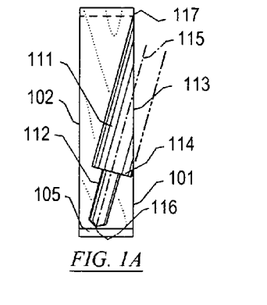
FIG. 1A is a side-sectional view taken along the line 1A of FIG. 1, showing an axis 115 of a pocket drill arranged to generate a full pocket hole 111 in the workpiece, wherein the slant angle between a front face 101 and the axis 115 is about 15 degrees.
Figure 1B:
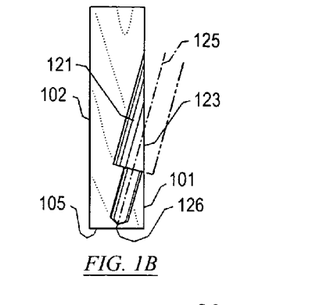
FIG. 1B is similar to FIG. 1, but showing an axis 125 of a pocket drill arranged to meet at center 126 of a ½ inch thick workpiece in a transverse direction, which resulted in the failure to generate a full pocket hole 121.

A workpiece 10 is illustrated in a front view showing two pocket holes drilled adjacent each other. An axis 115a is not perpendicular to the end 105 of the workpiece; an axis 125a is perpendicular with respect to the end face. The workpiece 10 may comprise a front face 101, a rear face 102, and an end face 105 that may or may not be perpendicular to the front face 102 and two side faces 102 and 104 that may or may not be parallel to each other or perpendicular to the end face 105. The front face 101 is a surface that is intended to have an oval opening 113 or 123. FIG. 1A shows a full pocket hole 111 in the workpiece generated by a pocket drill having an axis 115, wherein the slant angle between a front face 101 and the axis 115 is about 15 degrees. FIG. 1B is similar to FIG. 1A, but showing an axis 125 of a pocket drill arranged to meet at center 126 of a ½ inch thick workpiece having a front face 101 and a rear face 102 in a transverse direction, which resulted in not generating a full pocket hole 121, that is, the hole will not accommodate the screw head which will extend beyond the face of the workpiece. These views show that it is desirable to permit the drill guide carrier height, that accommodates different thickness workpieces, to be adjusted at infinite height positions because it may be necessary to compromise the centering of the exit point of the drill and subsequently the screw to permit the exit point to be off center in order to fully receive the screw head.

As used hereinafter, the following terminologies are defined in reference to FIGS. 1, 1A and 1B: A longitudinal direction is a direction parallel to a front face 101 or a rear face 102 of the workpiece, and perpendicular to the end face 105. A lateral direction is a direction perpendicular to the longitudinal direction and may be parallel to the end face 105. A transverse direction may be a direction perpendicular to both the longitudinal and the lateral direction or a direction from the front face 101 to the rear face 102. A drilling direction may be a direction parallel to axes 115 and 125, which may be at a slant, that is, an acute angle with respect to the workpiece longitudinal direction. The drilling direction is generally perpendicular (line 125a), yet not always perpendicular (line 115a) with respect to the lateral direction. A pocket hole depth is the distance between the top 117 of an oval opening 113 and a pocket seat 114. A step hole depth is the distance from the pocket seat 114 to the exit point 116, which may be fully (not shown) or partially drilled as shown at step hole 112.

Also as used hereinafter, the following terminologies are defined in reference to FIGS. 2 and 2A: A front surface of a drill guide carrier is shown at 23; it is the surface that abuts the face of the workpiece and is clamped prior to drilling the pocket hole. End stops 212, 213 and 278 are in reference to the workpiece end face 105, as shown in FIG. 1, or end face 204, as shown in FIG. 2A. End points may comprise at least one or two points, a line or a surface. An auxiliary surface, such as 214, is coplanar with the front surface of the drill guide carrier front surface 231, which abuts the front face 202 of the workpiece. It should be understood, however, that the terms are used only for purposes of description, and are not intended to be used as limitations. Accordingly, orientation of an object or a combination of objects may change without departing from the scope of the invention.

An exemplary embodiment 20 for drilling pocket holes (hereinafter "drilling device") is disclosed in FIGS. 2, 2A, 2B, 3 and 3A. The drilling device 20 comprises base 21 on which is mounted, or is integral with, guide structure 22; a drill guide carrier 23 is slidably mounted on the guide structure 22 in a generally vertical direction; a drill bit holder (hereinafter "drill holder") 42, 44 is slidably mounted on a bars 41, 43 and has a central opening 421 (FIG. 4B) on which is disposed a step collar 425 in which a drill bit 14 may be selectively mounted in the drilling direction; a gauging structure 24 that may be disposed on the base 21 may help position the guide carrier 22 according to workpiece thickness; a clamp body 27 is movable in a transverse direction to and away from the base 21 for clamping workpiece 201; a lateral stop structure 25 to determine pocket hole distance from a side face 205; a yoke 29 that functions as a second base holds a compression spring 341 to provide clamping force onto the rear face 203 of the workpiece via the clamp 27; and a cable assembly 33 connecting the clamp 27 and an amplifying structure or amplifier 30.

Figure 2:
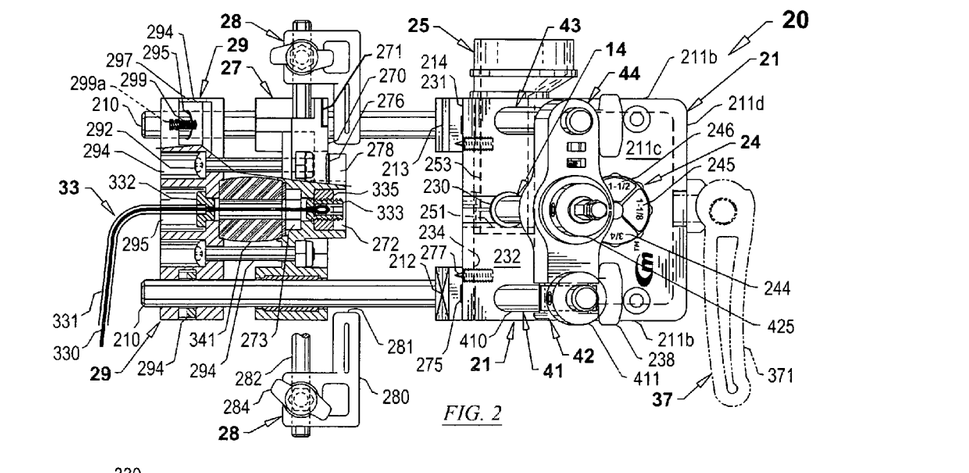
FIG. 2 is a top view of an exemplary embodiment 20 of a drilling device of the present invention.
Figures 2A, 2B:
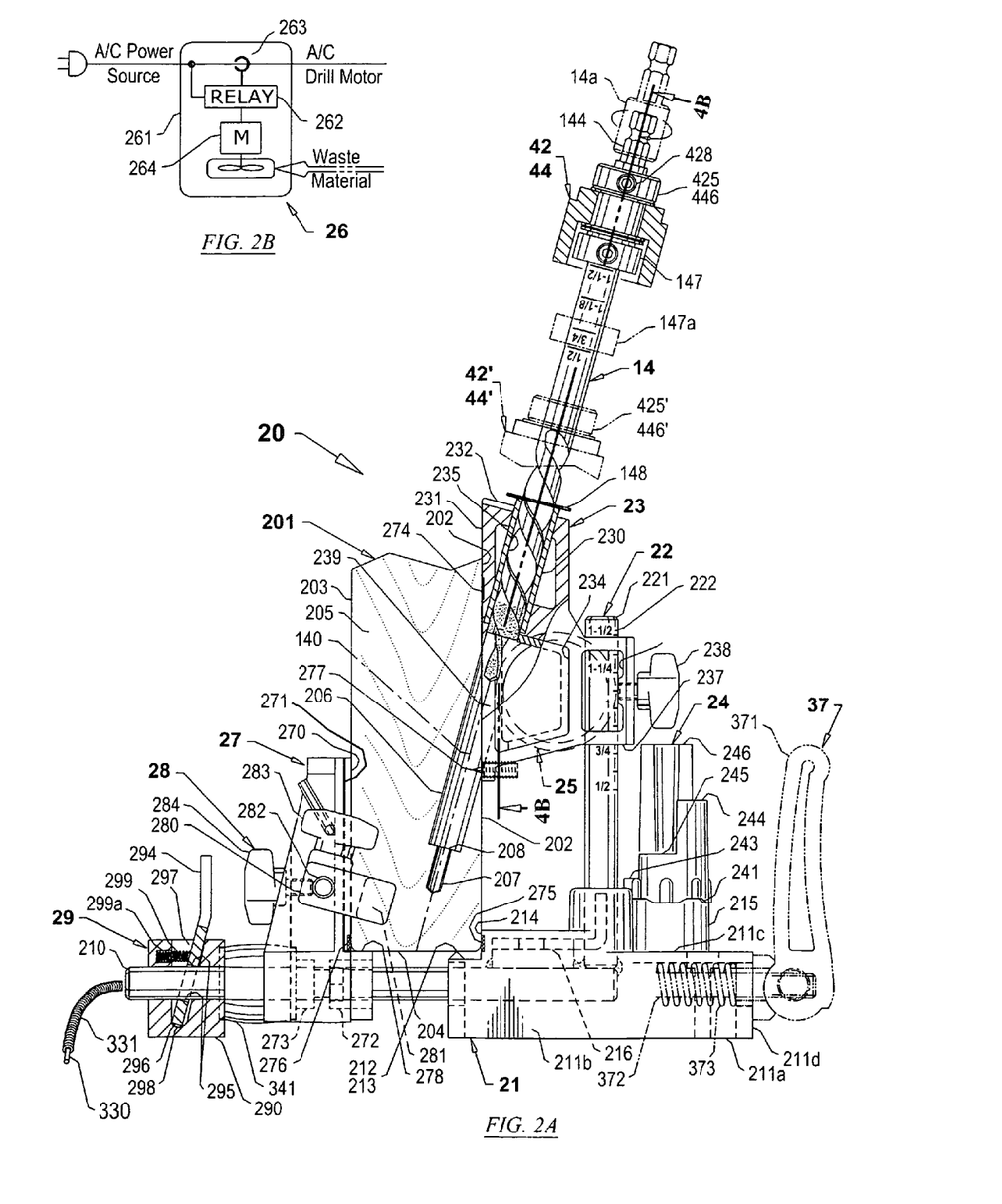
FIG. 2A is a side view of FIG. 2, with parts broken away along the centerline of the guide carrier 23 showing a pocket drill bit 14 at a pre-drilling position and a pocket hole 206 formed in a 1½ inch thick workpiece 201 by the pocket drill bit.
FIG. 2B is a schematic diagram of a wood waste remover 26 for use with the drilling device embodiment 20.

The base 21 as shown in FIGS. 2 and 2A may have a bottom 211a that may be placed or secured on a tabletop by screws (not shown) through mounting holes 211e; two side faces 211b disposed laterally; an upper 211c at which a turret base 215 and the guide structure 22 shown as two rigid bars 221 are disposed; an auxiliary surface 214 that engages with workpiece 201 and may have anti-skid pads 275; an end point 212 and an end line 213, on which end face 204 is seated; and two laterally disposed rigid bars 210 at which the clamp 27 and the yoke 29 are slidably disposed.

The two longitudinal rigid bars 221 and two transverse rigid bars 210 may be welded together with an L-shaped bracket 216 that may be embedded in a plastic material by insert molding or may be mounted on an aluminum casting material, which may form the base 21.

The guide structure 22 may comprise at least one rigid bar 210, a channel, a pocket, or a wall plate having a slot formed therein, wherein the guide carrier 23 may have at least one corresponding opening for the rigid bar, a block for the channel, a chunk for the pocket, or a fastener for the slot in the wall plate, respectively, so that the guide carrier 22 can be moved and positioned with respective to the base 21, although the invention is not so limited. The guide structure 22 as shown can have two rigid bars 221 disposed at the base to guide the guide carrier 23 to position corresponding with workpiece thickness and secure its position by knob screws 238, wherein indicia 222 indicating workpiece thickness and may be disposed on rigid bars 221. The rigid bars 221 as shown in FIG. 2A are disposed at the base 21 in the longitudinal direction. Yet they may be disposed parallel to the axis 140, the drilling direction, which provides a benefit of a linear stroke requirement of the clamp 27 for clamping workpiece in half.

The guide carrier 23 may be a L-shaped block and may have two laterally disposed holes formed therethrough that closely fit the rigid bars 221 and may comprise a front surface 231 that may be a coplanar surface with the auxiliary surface 214, which urge the front face 202 of workpiece; a drill bit passage or an oval-shaped opening 239, formed in the front surface 231, through which a pocket drill bit 14 exits; a drill entrance surface 232 that may be perpendicular to the drill axis 140; a bushing 230 having a slant drill bit passage or a bore 235 to receive the drill bit 14, disposed in between two laterally disposed retaining structure 41 or 43 that are shown as two rigid bars 410 and 430, and connected to the opening 239; a truncated isosceles-shaped lateral through opening 234 that may communicate with the bore 235 and the opening 239, which receives a hose adapter 25 to pull waste material such as wood chip and dust or waste material generated during drilling the workpiece; and anti-skid structures shown as adjustable anti-skid pins 277 and anti-skid pads 274, which are disposed at the front surface 231. The inner side of opening 239 communicating with the lateral opening 234 may serve as a chip breaker by allowing waste material generated during drilling to exit.

The gauging structure 24 may be rotatably mounted on the turret base 215 and may have a plurality of reference seats and corresponding indicia 243, 244, 245 and 246 that indicate workpiece thickness, wherein a rear bottom 237 may sit thereon. The gauging structure 24 further comprises indicia 222 disposed at the guide structure that helps the user position the guide carrier 23 corresponding with the workpiece thickness.

Figure 4B:
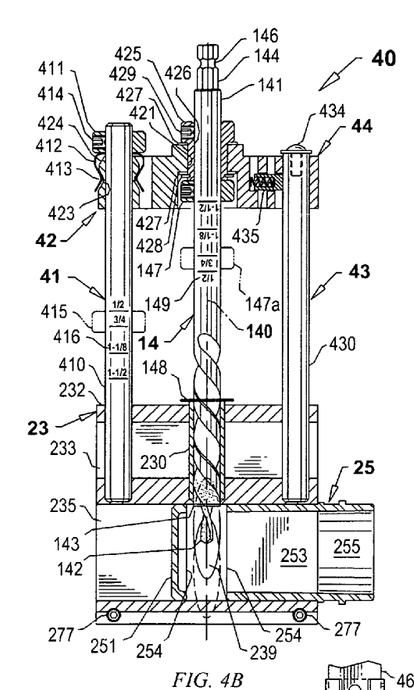
FIG. 4B is a cross sectional view taken along the lines 4B-4B of FIG. 2A. Each left-hand side view and right-hand side view should be transposed with respect to a drill bit axis 140. Each view shows that a drill bit carrier 42 or 44 is kept at a pre-drilling position and slidably/reciprocally mounted on a retaining structure 41 or 43, which is mounted on the guide carrier 23.

One end of the hose adapter 25 shown in FIGS. 2, 2A and 4B may be shaped to fit into a truncated isosceles triangular lateral opening 234 that is disposed in the guide carrier 23, and may comprise a truncated isosceles triangular section 253 to fit into the lateral opening 234, which enables the hose adapter to be detachably mounted either from a left-hand or a right-hand side of the guide carrier 23 for the user's convenience; an end 251; and a transverse opening 254 formed near the end 251 to communicate with the opening 239 and the partially open bore of the bushing 230. the other end of the hose adapter 25 may be a round tubular section 255 that may be shaped to fit a conventional suction hose (not shown) that may be connected to a waste material remover 26.

The waste remover 26 may comprise a housing 261 that has a relay 262 responding to a current or a vibration sensor 263 to activate a blower motor 264 on which an impeller 265 is mounted for the AC power supply. For pneumatic systems, an airflow sensor may detect the airflow rate changes, which may activate a pneumatic blower too. Thus the blower motor 264 turns on only whenever a drill motor (not shown) is used to drill the workpiece, which provides benefits of noise reduction from the constant blower motor and saving electric power.

The clamp 27 may be a L-shaped block, may be located in front of the front surface 231 and may comprise: two holes formed therethrough that closely fit to slide on the rigid bars 210 in the transverse direction; a clamping surface or rear surface 270 that urges the rear face 203, on which at lease one anti-skid pad 276 is disposed to engage with a rear face 203; a laterally disposed hole to mount a lateral stop structure 28; an end surface 278 on which end face 204 is seated; at least one recess surface 271 from the rear surface 270 for use with the amplifier 30; and two oppositely formed cavities 272 and 273. The cavity 272 may withhold a nut 335 that engages a second tension screw 333 and other cavity 273 may withhold a nut (not shown) that engages a clamp screw 372.

FIGS. 2 and 2A show the end face 204 in workpiece seated on the end point 212, the end line 213 and end surface 278. The end stop may comprise the end point 212, the end line 213 and end surface 278. During drilling the workpiece, waste material can be easily piled on the end surface 278, which results in an inaccurate longitudinal position of the pocket hole 207. Yet, the end point 212 and the end line 213 have less probability of the waste material piling thereon.

The lateral stop structure 28 may be disposed at, at the base 21 at the guide carrier 23 or at the clamp 27 to set a lateral position of the pocket hole 206 from the side face(s) 205 in the workpiece. FIGS. 2 and 2A show the lateral stop structure 28 disposed at the clamp 27 and mounted thereon by a laterally disposed hole therethrough to receive a bar 282 that extends laterally and may further comprise: a knob screw 284 disposed at the clamp 27 to secure the bar 282; at least one L-shaped stop bracket 280 which is adjustable laterally to engage with a side face 205 from which a desired pocket hole 206 distance may select; a knob screw 284 to secure the stop bracket 280; and the tip 281 may comprise a point, a line or a flat surface that engages to the side face 205. A benefit of the lateral stop structure 28 is providing repeatedly the same lateral distance of the pocket hole 206 from the side face 205.

The yoke 29 may be bar-shaped, used as a secondary base separated from the base 21, mounted on a tabletop and comprised of: two laterally disposed holes formed therethrough that closely fit the rigid bars 210 to slide in the longitudinal direction; a bottom 290 that may be coplanar to the bottom 211a; two laterally disposed V-shaped cavity 297 to hold a braking lever 294; two laterally disposed holes 292 for tension screws 291; and a central opening 293 for a casing stop 332 that urges one end of the cable assembly 33. The yoke 29 may be placed in between the clamp 27 and the amplifier 30 and may provide a proper preload force onto the compression spring 341 by pulling the clamp 27 toward the yoke 29 by turning tension screws 291.

It is found in practice that use of a common caulking dispenser, bar or pipe clamp mechanism can benefit a quick positioning of the clamp 27. A braking lever 294 is U-shaped and made of ferrous material having two laterally disposed ends 296 and openings 295 that slackly fit on outer surface of the rigid bars 210. A half of the braking lever 294 is suspended from a rigid bar 210 that passes through the opening 295 in the braking lever 294. Each end 296 of the lever 294 is pivotably captured in a recess 298 within the V-shaped cavity 297 formed in the yoke 29 such that the lever 46 may pivot within a constraint defined by the surface of the recess 298 and by binding of the lever 294 with the rigid bar 210 when an edge of the opening 295 in the lever 294 engages the surface of the rigid rod 210. Each spring 299 sits in a pocket 299a in the yoke 29 and biases the other end of the lever 294. The biased position of the lever 294 is limited by the binding interference between the openings 295 of the lever 294 with the rigid bars 210. The clamp 27 tied to the yoke 29 can be advanced together toward the guide carrier 23 merely by pushing. During and after this advancing operation, the lever 294 holds the clamping force from the clamp 27.

Figure 3:
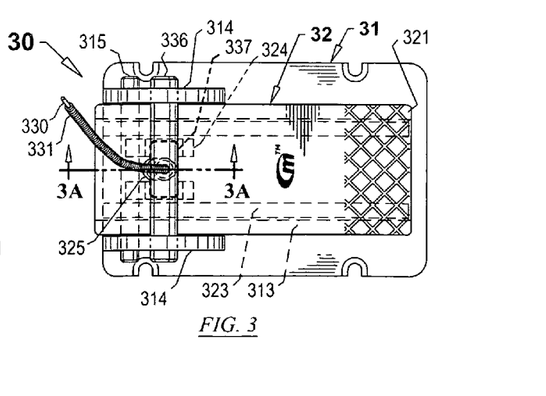
FIG. 3 is a top view of an amplifying structure 30 for use with the drilling device for clamping and unclamping the workpiece by, for example, use of a foot pedal actuator.
Figure 3A:
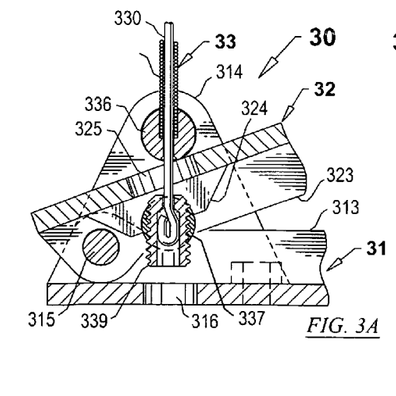
FIG. 3A is a sectional view taken along the line 3A-3A of FIG. 3.

The amplifying structure or amplifier 30 may function like a pedal for powering the clamp 27 and may comprise a fulcrum 31 that may be placed on a floor and a lever 32 that may be pivotally coupled to the fulcrum 31 by a laterally disposed pivot pin 315, which are connected by a cable assembly 33.

The fulcrum 31 may be rectangular shaped and may comprise: two longitudinally disposed ribs 313 whose one end may have mounting holes for the pivot pin 315; an access hole 316 to reach the socket formed in a first tension screw 339; and two laterally disposed upright supports 314 to uphold a casing support 336.

The lever 32 may be rectangular shaped and may be biased upward by a compression spring 341, yet maintain its limited angular position with respect to the fulcrum 31 by the casing support 336 and may comprise: two longitudinally disposed ribs 323 whose one end may have holes for the pivot pin 315; two pin holder 324 to sustain a cross threaded pin 337 that receives the tension screw 339; and a lever end 321 where the foot may be applied to exert force for clamping.

The cable assembly 33 may transmit force generated from the amplifier 30 to the clamp 27 and may comprise: a cable 330 made of a music wire or a wire rope that may be shielded by a spirally wrapped wire casing 331 whose two ends may urge the casing support 336 and the casing stop 332; and the tension screw 339 and the tension screw 333, which may be modified from a socket set screw that may have extended pocket and through hole to retain the cable 330, and may be adjustably mounted in the pin 337 and a nut 335 that may be disposed at the cavity 272 in the clamp 27.

The compression spring 341, as shown in FIG. 2, disposed in between the clamp 27 and the yoke 29 and shown as a marshmallow type made of urethane material, although the invention is not so limited. Any type and size of conventional compression springs can be used as long as it can perform the intended function. In a particular embodiment, Part No. U03112-1250-80 A from Century Spring Corp., having office in Los Angeles, Calif., is about 1.00 inch (25.4 mm) in length, about 0.81 in (20.6 mm) in outer diameter, about 0.31 inch (7.9 mm) in inner diameter, which has a spring constant of about 1,200 lbs/inch (210 N/mm), or a Part No. D-19 whose spring constant is about 600 lbs/inch (105N/mm), although the invention is not so limited.

The distance from the clamping surface 270 to the recess surface 271 may be about 0.125 inch (about 3.2 mm) as an example. The spring 341 may be compressed about 144 lbs (about 65 Kgf) by turning tension screws 291 followed by sliding the clamp 27 and yoke 29 together toward the two coplanar surfaces, the auxiliary surface 214 and the front surface 231, wherein workpiece 201 is placed in between the front surface 231 and the recess surface 271. Then the yoke 29 may be secured on the rigid bars 210 merely by itself.

Pressing on the lever end 321 causes the spring 341 to be further compressed or pulled approximately 0.20 inch (about 5.1 mm) to be able to insert workpiece 201 in between the rear surface 270 and the front surface 202, and followed by releasing force on the lever end 321, which results in a clamping force or output force of about 240 lbs (about 109 Kgf) on the workpiece. The distance ratio from the pivot pin 315 to the pin 337 and the lever end 321 as shown is 1:8. Thus 30 lbs (13.6 Kgf) input force at the lever end 321 by a foot can transmit 240 lbs (109 Kgf) output force that is needed for the movement of the clamp 27. After clamping and drilling, the workpiece can be repositioned for next drilling or removed from the drilling device 20 by pressing the lever end 321.

Figures 3B, 3C, 4A:
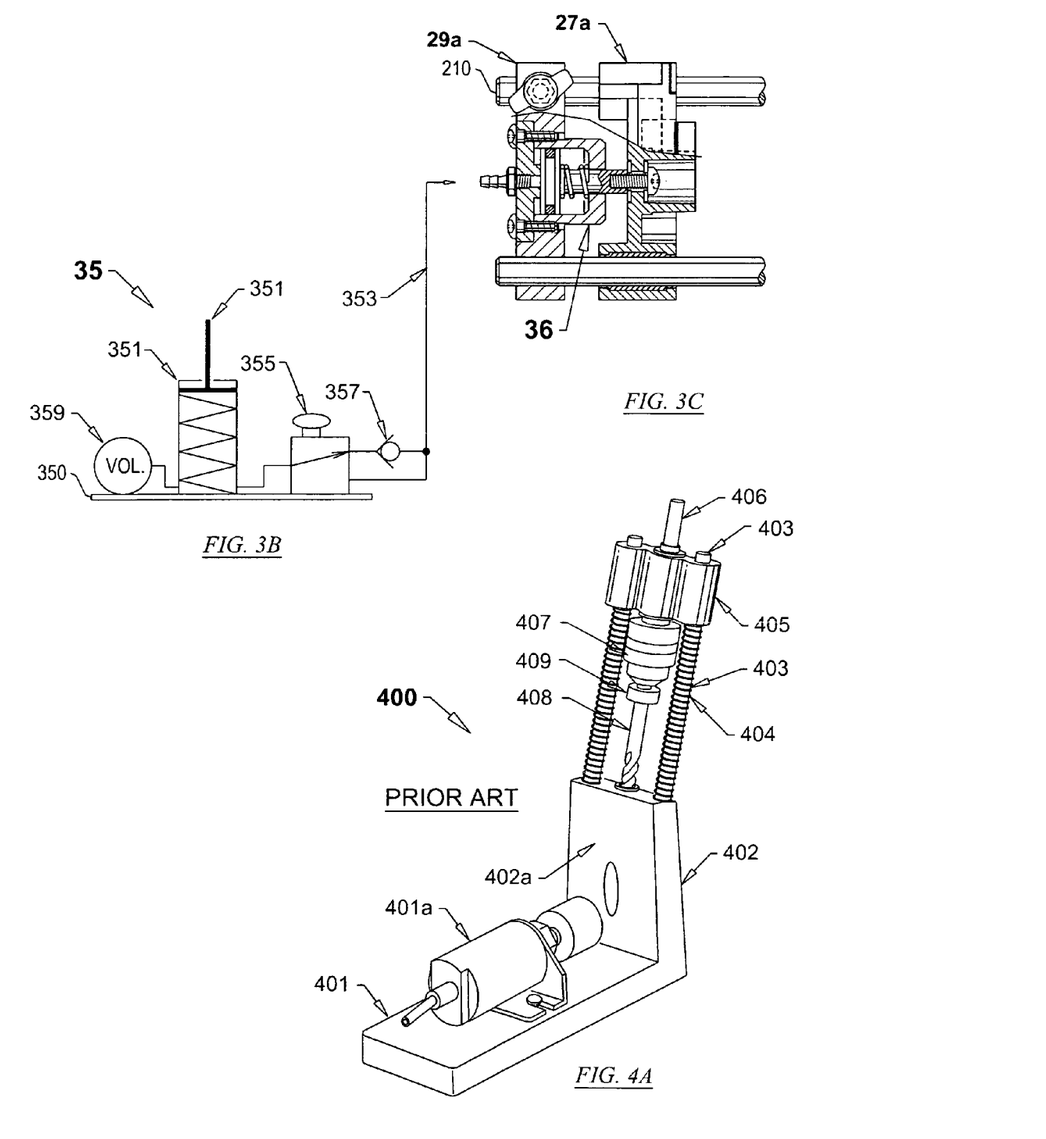
FIG. 3B is a schematic diagram of a fluid amplifying structure 35 for use with a clamping cylinder 36 which is shown in FIG. 3C.
FIG. 3C is a sectional view similar to a left-hand side in FIG. 2, showing a clamp 27a is connected to a spring return clamping cylinder 36 which is disposed at a yoke 29a, which are mounted on two laterally disposed rigid bars 210.
FIG. 4A is a perspective view of a prior art drilling device 400.

Another fluid medium amplifying structure or amplifier 35 is shown as a schematic diagram in FIG. 3B, which is similar to a hydraulic jack whose force is transmitted from a rod 351 by means of fluid. A tubing 353 is connected to the yoke 29a (FIG. 3C) at which a clamping cylinder 36 is disposed, which provides a clamping force to the clamp 27a. Media of fluid used for the amplifier 35 may include water, oil and air. The amplifier 35 may be built on a plate 350 and may comprise a spring extended cylinder 351 having a cylinder rod 352, which may be 0.5 inch (12.7 mm) in bore diameter and 0.50 inch (127 mm) in stroke; a three-way diverter valve 355 having a button disposed thereon; a check valve 357; a volume tank 359; and tubing. Pressure regulator (not shown) may be disposed in between the cylinders 351 and 36 to select desired clamping force and to protect all hardware including tubing 353. Another alternative for this amplifier 35 may be Model No. CLR-702-HP, a totally self-contained power unit, from Carr Lane Mfg. Co., St. Louis. Mo.

The spring return clamping cylinder 36 may be disposed at a yoke 29a having its rod connected to the clamp 27a and may be 0.87 inch (22.1 mm) in bore diameter. Having bore dimensions set forth above, cylinder bore area ratio of 1 to 3, a 60 lbs (27.2 Kgf) foot input force on the cylinder rod 352 can deliver 180 lbs (81.7 Kgf) output force to the clamp 27a.

As the cylinder rod 352 is pressed, compressed fluid may pass through the diverter valve 355, the check valve 357, the cylinder 36 to push workpiece by the clamp 27a and may stay clamping workpiece without holding the cylinder rod 352 until the diverter valve 355 is pressed to release the compressed fluid for unclamping workpiece. The clamping cylinder 36 disposed at the yoke 29a may be alternatively disposed at the base 21 to achieve the same clamping requirement.

The fulcrum 31 of the amplifier 30 and the plate 350 of the amplifier 35 may be placed on the floor for a user to press the lever end 321 and the rod 351 by a user's foot, receptively. Alternatively the amplifiers 30 and 31 may be mounted on the edge of a worktable and may be pressed by a portion of user's body such as the abdomen, hip or thigh. Therefore, user powered hand-free operation for the clamping and/or unclamping workpiece can be achieved by use of the amplifiers 30 and 31 to generate higher output; otherwise a hand is tied every time for clamping and unclamping the workpiece prior to and after drilling the pocket hole.

FIG. 4A. shows a discontinued Model No. K200, Semi-Automatic Pocket Hole Press, from Kreg Tool Co. in Huxley, Iowa. A drilling device 400 has a base 401 on which air cylinder 401 is attached and may further comprise: a guide carrier 402 fixedly mounted on the base 401; a front surface 402a urging a workpiece; a retaining structure mounted on the guide carrier 402, which comprises two rigid bars 403 on which compression springs 404 surround; a drill bit carrier 405 slidably and reciprocally mounted on the retaining structure; a shank 406 that is rotatably coupled to and axially retained in a drill bit carrier 405 to be connected to a drill motor (not shown); and a chuck 407 mounted on the shank 406 and disposed in between the drill bit carrier 405 and the guide carrier 402 to hold a drill bit 408 on which a stop collar 409 is adjustably mounted.

The use of embodiment 400 for drilling pocket holes is limited to about ¾ inch (about 19 mm) thick material because the stroke of the drill bit carrier 405 is limited not only by an axial obstruction of the chuck 407 but also by solid height obstruction of each spring 404 which is placed in the outer circumference of each rigid bar 403. Otherwise having extra long rigid bars 403 deteriorates the structural solidity. The required drilling stroke from a pre-drilling position to a post-drilled position of the drill bit 408 is set forth below. There is no provision for the drill bit carrier 405 from separating away from the guide carrier 402.

The drilling device 20 as shown in FIG. 2A provides versatility of drilling pocket holes on a material thickness ranging from common ½ inch (12.7 mm) to 3.50 inch (88.9 mm) because of adjustability of the guide carrier 23 in the longitudinal direction by the guide structure 22 and of the infinite length of the rigid bars 210 in the transverse direction. The workpiece 201 shown is made of 1.50 inch (38.1 mm) thick material, which may require the step hole depth to be about 1.25 inch (about 31.8 mm) to use a 2.5 inch (63.5 mm) long screw to fasten with a second workpiece having 1.50 inch (38.1 mm) material; the required stroke from the pre-drilling position to the post-drilled position of the drill bit 14 requires at least 2.55 inch (about 65 mm) for an angle of 15° drill axis 140 with respect to the front surface 231; meanwhile at least 1.6 inch (about 41 mm) stroke is required for 0.50 inch (12.7 mm) thick material.

Another alternative to the amplifiers 30 and 35 may be the use of a clamping structure 37, as shown in FIGS. 2 and 2A, which may comprise: a cam handle 371 disposed at a fore wall 211d; a clamp screw 372 connecting the handle 371 and a nut (not shown) disposed at a cavity 273; and a compression spring 373 urging the clamp 27, the clamp 27 and the base 21. Rotational movements of handle 371 may cause pulling and pushing the clamp 27 via spring 373 for clamping and unclamping workpiece, as disclosed in U.S. Pat. No. 6,637,988.

Retaining structures 41 and 43 are shown in FIGS. 2 and 4B, which retains the drill bit 14 that is to be mounted at a chuck of a drill motor (not shown) at a pre-drilling position by itself; the weight of drill bit 14, a drill motor (not shown), and the drill bit carriers 42 or 44 are kept at a pre-drilling position and movable reciprocally sliding linearly to a post-drilled position toward and away from the guide carrier 23. Other retaining structures 45, 46 and 47 are shown in FIGS. 4C, 4D, 4E and 4F as cross sectional views. It should be understood that each left-hand side and right-hand side view should be transposed with respect to the drill bit axis 140, which applies to FIGS. 4B-4F. The drill bit 14 is retained and guided by the retaining structure and the drill bit carrier so that it is always in the ready position to plunge into the workpiece.

The retaining structure 41, shown on the left-hand side in FIG. 4B, may comprise two laterally disposed rigid bars 410 that has a parallel relationship with drill axis 140 in the drilling direction and may be fixedly mounted at the guide structure 23; a plurality of indicia 416 that indicate workpiece thickness to mount an auxiliary stop 415; and at least one U-shaped snap spring 412 mounted on a ring 411 via a set screw 414 at an opposite side from the entrance surface 232 to retain the drill carrier 42, wherein the snap spring 412 may comprise at least one inwardly rest bent 413 that engages a V-shaped notch 423 formed in the drill carrier 42. Thus the snap spring 412 may be adjustably positioned along the rigid bar 410 to select the pre-drilling position.

The drill carrier 42 may be a rectangular bar shaped to hold the drill bit 14 and may comprise a central opening 421 that receives an annular shaped step collar 425 in which the drill bit 14 may be held by a radially disposed set screw 429; two laterally disposed holes formed therethrough that closely fit the rigid bars 410; at least one chamfer 424 for smooth engagement with the snap spring 412 when the drill carrier 42 is pulled to pre-drilling position; at least one V-shaped notch to engage with the rest bent 413 to retain the drill carrier 42 at the pre-drilling position. The step collar 425 may be held axially within the drill carrier 42 by a radially extended flange at one end and by a retaining ring 428 at the other end, wherein two washers 427 may be used in between the step collar 425 and the drill carrier 42 to reduce wear when the step collar 425 is rotating.

The adjustability of the stroke and the position of the drill bit 14 according to the workpiece thickness may be achieved by positioning an auxiliary collar 415 on the rigid bar 410 or a stop collar 147 on the drill bit 14. For a ½ inch thick workpiece, the position of the auxiliary collar 415 or the stop collar 147a is shown as a double-dotted line, wherein indicia 416 and 149 indicating workpiece thickness may be formed on the rigid bar 410 and the drill bit 14, respectively. Thus selection of the pocket hole depth and the step hole depth can be achieved in various ways as set forth above and below.

The retaining structure 43, shown on the right-hand side in FIG. 4B, may be similar to the retaining structure 41 having two laterally disposed rigid bars 430 that has a parallel relationship with drill axis 140 in the drilling direction and may be fixedly mounted at the guide structure 23; a screw 434 with stop washer, which prevents deriling the drill carrier 44 from the rigid bars 430; and a holder 435 disposed laterally at the drill carrier 44, which retains the drill carrier 44 by friction in the rigid bars 430 with the drill bit 14.

The drill carrier 44 may be very similar to the drill carrier 42. It may have at least one laterally disposed space in which the holder 435 is biased by friction and/or a spring and two laterally disposed holes formed therethrough that closely fit the rigid bars 430.

Figure 4C:
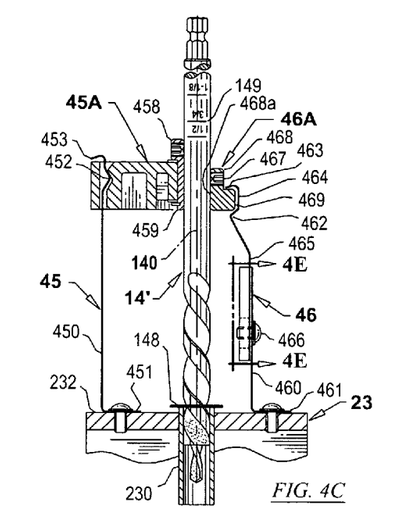
FIG. 4C is similar to FIG. 4B, but showing another two different ways to retain a drill bit carrier 45A or 46A on the retaining structure 45 or 46, which is mounted on the guide carrier 23. Each left-hand side and right-hand side view should be transposed with respect to the drill bit axis.
Figure 4D:
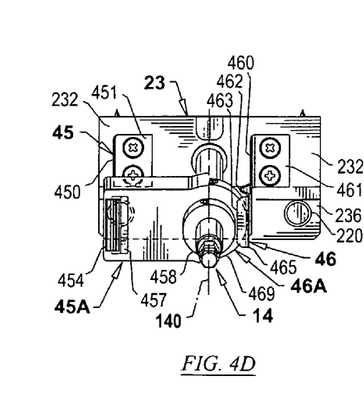
FIG. 4D is a top view of FIG. 4C.
Figures 4E, 4F:
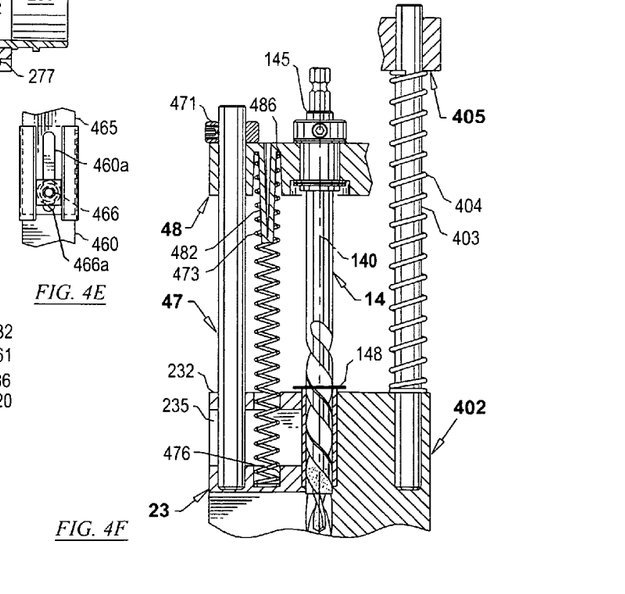
FIG. 4E is a side view seen from the line 4E-4E of FIG. 4C.
FIG. 4F shows another embodiment of the retaining structure of the drill guide carrier shown in FIG. 4B

FIGS. 4C-4E show other retaining structures 45 and 46 that are made of L-shaped leaf or flat springs having columns 450 and 460 to keep drill carriers 45A and 46A at the pre-drilling position by rest bents 452 and 462, respectively. Each hook 453 and 463 may be formed in each column 450 and 465 to prevent deriling the drill carriers 45A and 46A from the retaining structures 45 and 46, respectively. Each flat spring 450 and 460 having a base 451 and 461 is mounted on the drill entrance surface 232. The features of the drill carrier 45A having a step collar 458 may be equivalent to those of the drill carrier 42. Thus the position of the drill bit 14' with respect to the drill carrier 45A may be adjustable with indicia 149 formed thereon. The retaining structure 45 may be shaped as an arched flat spring whose one end may have alike a foot 451 mounted on the on the drill entrance surface 232 and the other end may be mounted alike as the foot 451 on the drill carrier 45A. The drill carrier 46A itself may be a step collar 468.

The retaining structures 46 enables adjusting the pre-drilling position of the drill bit 14' by a slot 460a formed at an upper column 465 which may be fastened to the lower column 460 by a screw 466 and a nut 466a. Thus the drill carrier 46A can be adjustably mounted in a drilling direction with respect to the guide structure 23 by adjusting the distance between an upper column 465 and a lower column 460.

The drill carrier 46A may be an annular shaped stepped stop collar 468 and may comprise a set screw 467 that selectively secures the drill bit 14' with respect to the stop collar 468; and an radially extended flange 469 that engages with the hook 463 and the rest bent 462. As shown in FIG. 4C, the cross section of the step collar 468 is L-shaped, but it can be also a rectangular shape to do the same purpose. The drill carrier 46A itself may be the step collar 468.

The left-hand side of FIG. 4F shows that the drill carrier 48 is retained at the pre-drilling position by a preloaded compression spring 473 whose ends are seated into round recesses 476 and 486 which are formed in the guide carrier 23 and the drill carrier 48, respectively, which may be guided by the retaining structure 47 which may be similar to the retaining structure 41 in FIG. 4B. Use of a collar 471 may enable the drill carrier 48 to keep at the pre-drilling position. Therefore when the drill carrier 48 moves to the post-drilled position, the full solid height of the spring 473 is embedded into recesses 476 and 486, which does not waste the space between the guide carrier 23 and the drill carrier 48. To prevent the spring from side bending when compressed, a guide rod 482 for the spring 473 may be disposed at the drill carrier 48.

The right-hand side of FIG. 4F is a partial cross sectional view of FIG. 4A showing the drill carrier 405 merely supported by the compression spring 404 that is placed on a peripheral of a rigid bar 403 in between a drill carrier 405 and guide carrier 402. The solid height of the spring 404 in between the drill carrier 405 and guide carrier 402 reduces the stroke of the drill bit 14, which may result in limited use of the prior art 400 to about a ¾ inch (19 mm) thick workpiece.

The twist pocket drill bit 14 may be always retained and guided its shank 145 within the drill carrier 42 via a step collar 425 and its drill 145 within the bushing 230, which is found in practice to use more brittle yet wear-resistant material for the drill bit 14 such as tungsten carbide (shown as dense dots) compared to conventional high-speed steel material, and which eliminates the possibility of dropping and breaking a drill bit through operator error. Thus the drill bit 14 may use tungsten carbide material for a step drill 142 and a portion of pocket drill 143 that adjoins the step drill 142, and less expensive material such as high carbon steel for the rest portion of the drill bit 14 including the shank 141. The drill bit 14 may have indicia 149 that indicate workpiece thickness for use with the stop collar 147 showing a position for 1.50 inch (38.1 mm) thick material and the stop collar 147' for 0.50 (12.7 mm) inch thick material.

The end portion of the drill bit 14 may further comprise a hex shank 144 having an annular groove 146, which may engage with a quick-change adapter 14a, shown a double-dotted line in FIG. 2A, having a ball detent built therein. Thus use of the quick-change adapter 14a mounted on a drill motor eliminates tightening and loosing its chuck for shifting from a drill bit to a screwdriver bit. To prevent wear caused by the rotating stop collar 148 that urges the bushing 230 at the post-drilled position, a washer 148 may disposed therein. The drilling angle 140, as shown in FIG. 2A, is at 15° and the diameter of the pocket drill bit 14 is ⅜ inch (9.5 mm).

Figure 5:
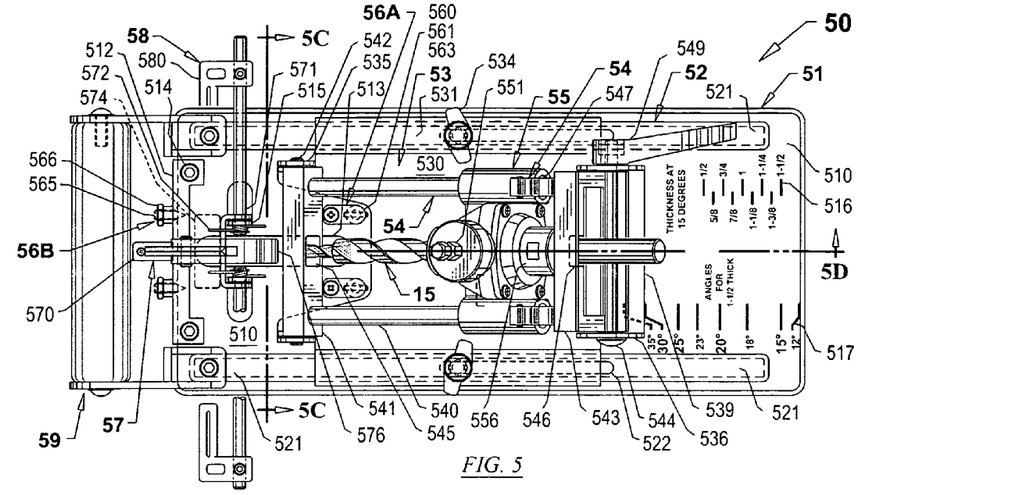
FIG. 5 is a top view of another exemplary embodiment 50 of a drilling device according to the present invention.
Figures 5A, 5B:
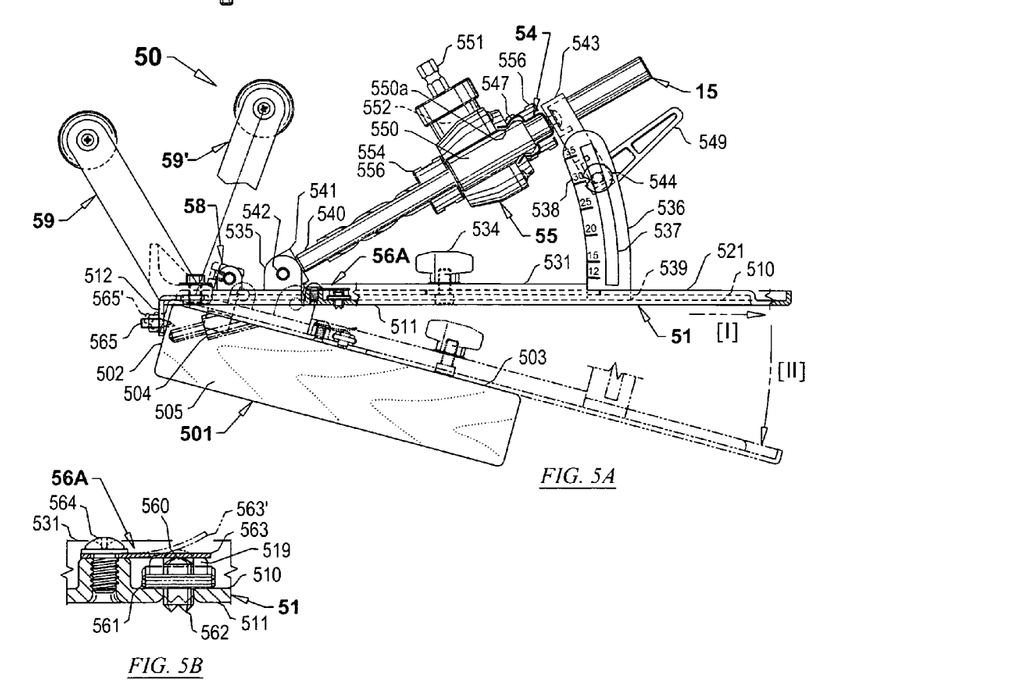
FIG. 5A is a side view of FIG. 5.
FIG. 5B is an enlarged cross sectional view from FIG. 5A, showing details of an anti-skid structure 56A.

Another exemplary embodiment 50 for drilling pocket hole (hereinafter "drilling device") is disclosed. In one embodiment, as shown in FIGS. 5-5D, the drilling device 50 may comprise: a base 51 at which a guide structure 52 is disposed, which may be adapted to engage a front face 503 in workpiece 501, and which may have a detachably mounted end stop 512 that urges an end face 502; a guide carrier 53 being slidably mounted on the base 51 via the guide structure 52 in a longitudinal direction; a retaining structure 54 pivotally mounted on the guide carrier 53; a drill bit carrier 55 (hereinafter "drill carrier") being reciprocally mounted in the retaining structure 54 and having a drill bit passage, bore or an opening 555 that keeps a drill bit 15 and yet is adjustable mounted in the drilling direction; indicia 516 and 517 that may be disposed at the base 21 and helps position the guide carrier 53 corresponding to workpiece thickness; anti-skid structures 56A and 56B to secure the drilling device 50 with respect to workpiece 501 during drilling; a clamping structure 57 detachably mounted on the base 51 having a clamping pad 574 movable in a transverse direction to and away from the base 51 for clamping workpiece 501, which may be used with, or without the anti-skid structures 56A and 56B; a lateral stop structure 58 to determine pocket hole distance from a side face 505; and a handle 59 that mounted on the base 51 to hold the device 50 on the workpiece during drilling. The drilling device 50 may comprise without the base 51 and the guide structure 22; the guide carrier 53 may directly urge the workpiece 501, although the invention is not so limited The base 51 may be a rectangular shaped plate, may have fore end near an end stop 512, an aft end near indicia 517 and may comprise: a front surface 511 urging a front face 503 in a workpiece 501; the end stop 512 detachably mounted by screws 514, which urges an end face 502; a drill bit passage or a central opening 513 through which a drill bit 15 exits; indicia 516 that is to be used for the longitudinal position of the guide carrier 53 corresponding to workpiece thickness at a common drill bit inclination of 15 degrees with respect to the front surface 511; and indicia 517 for the position of the guide carrier 53 corresponding with angles of the drill bit 15 with respect to the front surface 511 for 1½ inch (38.1 mm) thick workpiece.

The guide structure 52 may be a rectangular shaped plate, longitudinally movably mounted on an opposite surface 510 and may comprise two laterally disposed longitudinal guide 521 on which channels 531 may be formed in the guide carrier 53 that may be longitudinally adjustable and may be fixed in its position with respect to the base 51 corresponding to the indicia 516 or 517 by square nut and wing head screws 534, wherein a slot 522 may be formed in the longitudinal guide 521.

The guide carrier 53 may be slidably mounted on the base 51 via the guide structure 52, may support the retaining structure 54 and may comprise: two laterally disposed pivot brackets 535 about which a fore tie 541 in the retaining structure 54 is angularly mounted via pivot pins 542 at its fore end; and two arcuate brackets 536 having arcuate slots 537, which may enable the retaining structure 54 to be adjustable and to be fixed in its angular position with respect to the front surface 511, wherein at least one of the arcuate brackets 536 may provide angle indicia 538.

The retaining structure 54 may retain the drill bit carrier 55 (hereinafter "drill carrier") at which drill bit 15 may be disposed and may be pivotally mounted at the guide structure 53. The retaining structure 54 may comprise: two laterally disposed rigid bars 540 that have a parallel relationship with drill axis in the drilling direction; the fore tie 541 and an aft tie 543, which hold the rigid bars 540 together and have openings 545 and 546 therein for the passage of the drill bit 15; and at least one U-shaped snap spring 547 disposed at the aft tie 543 to engage V-shaped notches 550a formed in the drill carrier 55. The snap spring 547 shown in FIG. 5A may have the same feature and function as set forth in FIG. 4B; the snap spring 412 is mounted on a ring 411, which enables to select the pre-drilling position. The aft tie 543 may be a rectangular shaped and may be coupled to the arcuate slots 537 via a carriage bolt 544, which may secure its angular position by turning a clamping handle 549 that is coupled to the carriage bolt 544. Thus retaining structure 54 may be retained at the pre-drilling position by itself, movable reciprocally to a post-drilled position toward and away from the aft tie 543 and may provide variable pocket holes in workpiece.

The drill carrier 55 holds the drill bit 15 and may comprise: centrally located a tubular output shaft 554 having the bore 555 to receive the drill bit 15 that may be held by a set of collet/chuck 556 or set screws 557; a pinion and gear set 552 that connects an input shaft 551 and the output shaft 554, which is shown as a bevel gear set; and two laterally disposed holes formed therethrough that closely fit the rigid bars 540.

Figure 6:
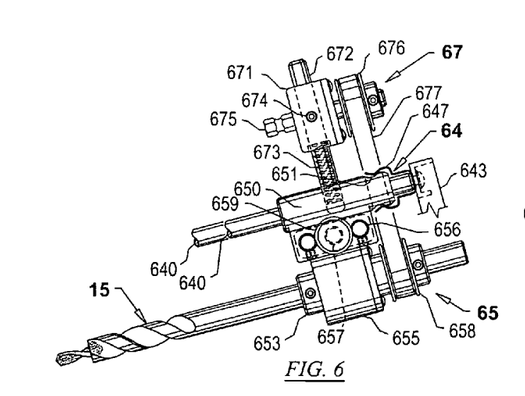
FIG. 6 is a partial side view similar to FIG. 5A.
Figure 6A:
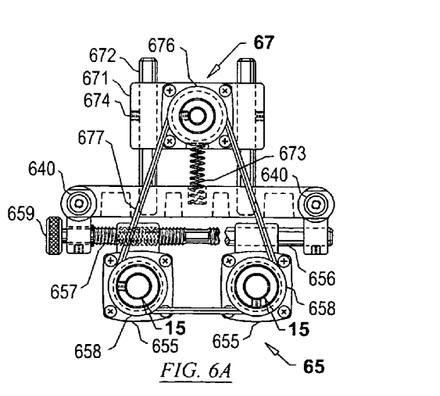
FIG. 6A is a right-hand side view of FIG. 6.

A drill motor (not shown) may drive the input shaft 551 or a drill motor may be a part of the drill carrier 55. The normal angle over parallel arrangement with respect to the drilling direction between the input shaft 551 and the output shaft 554 may provide two advantages; less structural stress to the retaining structure 54 because of no overhung load and space saving in the longitudinal direction. Use of the pinion and gear set 552 enables to choose any angle between the input shaft 551 and the output shaft 554. A parallel angular relationship of these two are shown in FIGS. 6 and 6A

The anti-skid structure 56A, shown a flat spring 563 for biasing the anti-skid pin 560 forwardly to the extended position, may be disposed at the base 51 and may comprise: the round pin 560 having multi-points 562 that engages workpiece and a cross pin 561 that guides the pin 560 in the transverse direction along a slot 519 formed in the base 51; and a flat spring 563 whose one end urges the pin body 560a and other end is fixed onto the base 51 by a screw 564. The pin 560 may be non-round in shape, which may eliminate use of the cross pin 561 and the slot 519. The pin 560 may be protruded from the front surface 511 and retracted (shown the spring 563') when the drilling device 50 urges workpiece 501.

The anti-skid structure 56B, shown as anti-skid pins 565 modified from setscrew having apex, may be disposed at the end stop 512 that engages the end face 502. One end of the anti-skid pin 565 is corn-shaped and may be secured by a nut 566 in the end face 502. The anti-skid structure 56B may be disposed at the base 51.

The clamping structure 57 may be detachably mounted on the base 51 and may comprise: a clamping pad 574 movable in a transverse direction to and away from the base 51 for clamping workpiece 501; an arm 573 that may be adjustable according to the workpiece thickness; a L-shaped bar 570 rotatable by a cam type clamp handle 576 about pivot pins 571; and the clamp handle 576 biased by torsional springs 572 and rotatable about a cam pin 575, which is disposed at two upright pivot brackets 515. FIG. 5 shows the operation of the clamp handle 576 from a unclamping (single-dotted line) to a clamped position (solid line).

The lateral stop structure 58 may be similar to that of 28 as shown in FIGS. 2-2A, may be mounted on the base 51 and may set pocket hole distance from a side face 505 in the lateral direction.

The handle 59 may be mounted on the base 51 to hold the drilling device 50 on the workpiece during drilling, which is especially useful for use with the anti-skid structure 56A or/and 56B; this operation may eliminate use of the clamping structure 57.

Figure 5C:
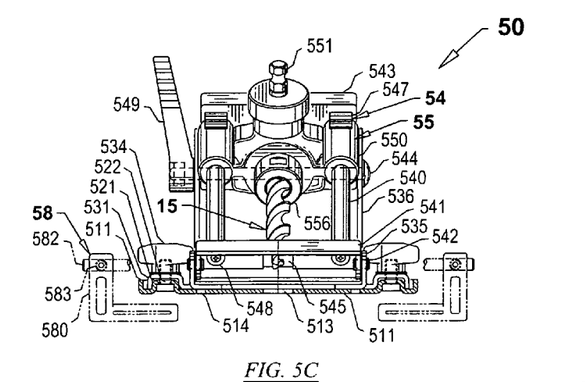
FIG. 5C is a front view of FIG. 5.
Figure 5D:
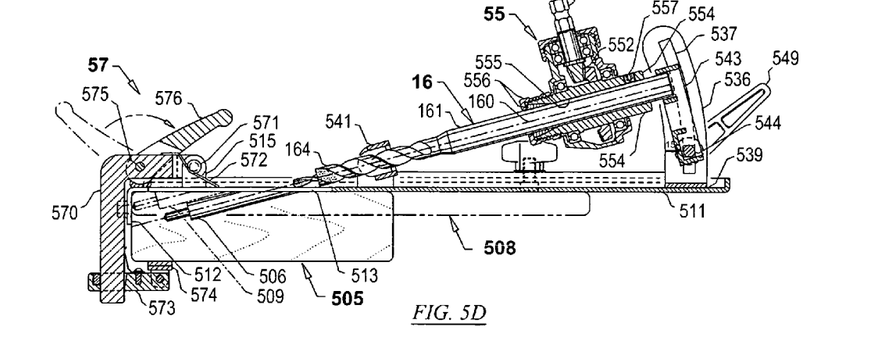
FIG. 5D is a cross sectional view along the line 5D of FIG. 5, showing the drilling device positioned on a workpiece by a clamping structure.

FIGS. 5A and 5C show use of the drilling device 50 on the 1½ inch (38.1 mm) thick workpiece 501. Bring the device 50 to urge the end face 502, as shown by an arrow [I], then tilt the device 50 downward, as shown by an arrow [II], for the front surface 511 to urge on the front face 503, shown as double-dotted lines, then push the drill carrier 55 from the pre-drilling position to the post-drilled position forming a pocket hole 504. A user's hand pressure secures the device 50 by means of the anti-skid structures 56A and 56B during drilling. The drilling angle as shown is at 30° and the diameter of the pocket drill bit 15 is 9/16 inch (14.3 mm).

FIG. 5D shows use of the drilling device 50 set at a 15° drilling angle on the 1½ inch (38.1 mm) thick workpiece 501 and ½ inch (12.7 mm) thick workpiece 508 that are secured by the clamping structure 57. A pocket hole 509 and pocket hole 506 are drilled in workpiece 508 and 505, respectively. The bore dimension of the bore 555 may be 9/16 inch (14.3 mm) in which the shank 161 of the pocket drill bit 16 is disposed and the diameter of the pocket drill 164 may be ⅜ inch (9.5 mm); the bore 555 also may receive the pocket drill bit 15 whose pocket drill diameter may be 9/16 inch (14.3 mm). Construction of each pocket drill bit 15 and 16 may use more wear-resistant material such as tungsten carbide material for their step drill and a portion of pocket drill adjoining the step drill.

The drilling device 50 may be constructed by having the drill carrier 55 which is mounted on the guide carrier 53 that has a front surface 511 therein, which urges workpiece 501; use of a novel feature of the retaining structure 54 as set forth.

Figures 7, 7A, 7B, 7C, 7D:
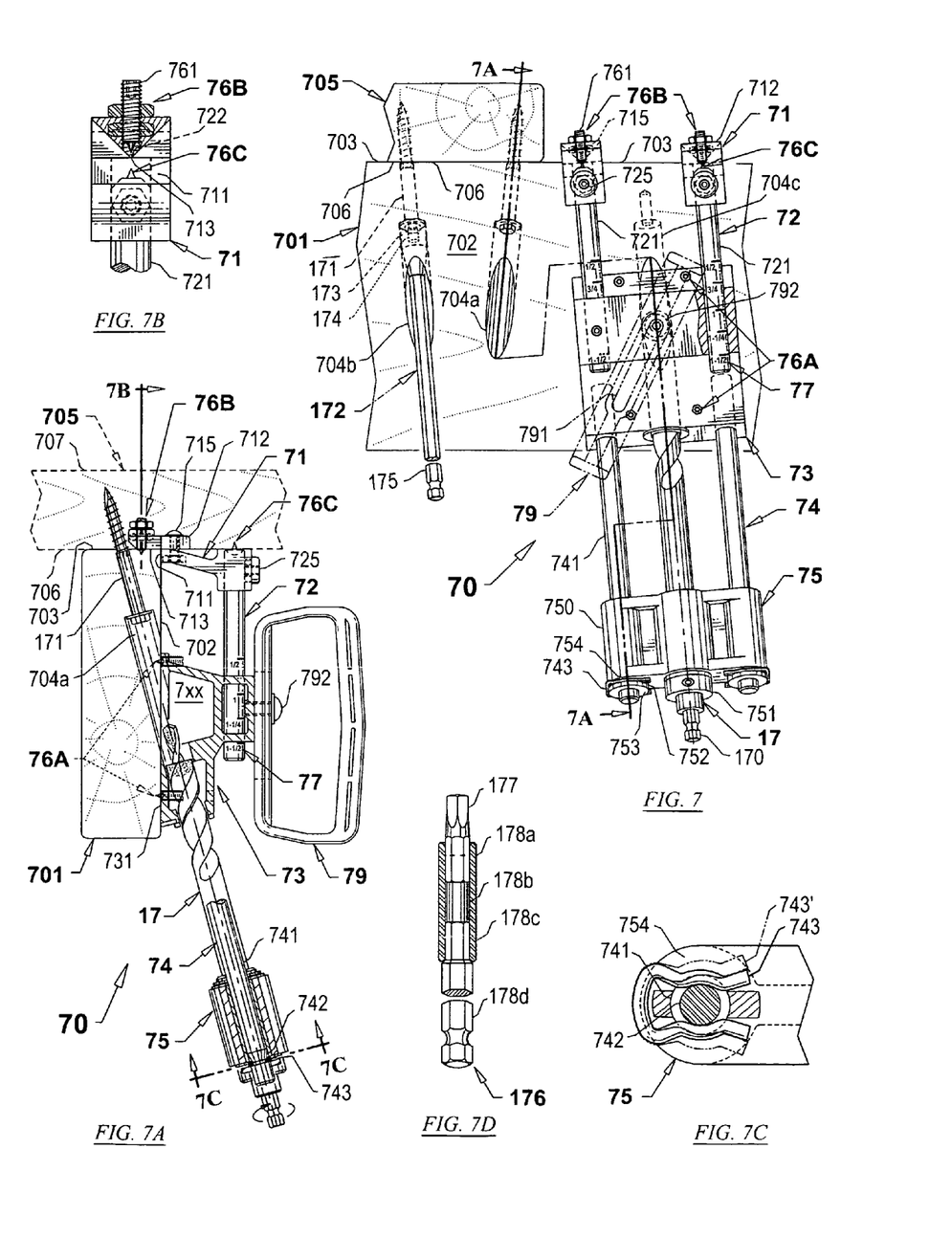
FIG. 7 is a front view of yet another exemplary embodiment 70 of a drilling device of the present invention, showing the drilling device mounted on a floor joist fastening a deck board to the floor joist.
FIG. 7A is a cross sectional view taken along the lines 7A-7A of FIG. 7.
FIG. 7B is a cross sectional view taken along the line 7B of FIG. 7A.
FIG. 7C is a cross sectional view taken along the lines 7C-7C of FIG. 7A.
FIG. 7D is a side and partial cross sectional view of a screwdriver.

The drilling device 50 without the end stop 512 may enable using this embodiment for the area where two workpieces are already assembled alike repairing squeaky floors as shown in FIG. 7A.

A drilling device 60, shown in FIGS. 6 and 6A, demonstrates use of two pocket drill bits 15 so that two pocket holes can be drilled simultaneously and use the identical pocket drill bit 15 as shown in FIGS. 5, 5A and 5C. The device 60 shows partial constructions having a retaining structure 64, a drill bit carrier 65 and an input structure 67.

The retaining structure 64 may be mounted at the guide carrier 53 (FIGS. 5-5D) and may comprise two laterally disposed rigid bars 640; an aft tie 643 and fore tie (not shown), which hold two rigid bars 640 together; and at least one U-shaped snap spring 647 disposed at the aft tie 643 to engage V-shaped notches 651 formed in the drill carrier 65.

The drill bit carrier 65 (hereinafter "drill carrier") holds the drill bits 15 and may comprise: two laterally located output tubular shaft 654 for receiving the drill bits 15; a head 650 having two laterally disposed holes formed therethrough that closely fit and are slidable on the rigid bars 640; two driven pulleys 658 disposed at the drill block 655 that are connected to an input pulley via a belt 677; and two drill block 655 that are movable toward and away from each other in the lateral direction via oppositely arranged threads 657 by turning the knob 659, which are guided by lateral bars 656.

The input structure 67 may comprise a block input 671 to which the input pulley 676 may be rotatably coupled and axially retained; and two laterally disposed guide rods 672 that may be mounted on the head 650. A drill motor (not shown) may drive the input shaft 675 or a drill motor may be a part of the input structure 67.

Adjustment of the distance between two drill bits 15 may as follows: move the input block 671 toward the drill block 655, turn the knob 659 to adjust the desired distance between two drill bits 15, move the block input 671 away from the drill block 655 until the belt 677 gets proper tension, then secure the input block 671 on the guide rods 672 with setscrews 674.

Still another exemplary embodiment 70 for drilling pocket hole (hereinafter "drilling device") is disclosed. In one embodiment, as shown in FIGS. 7-7C, the drilling device 70 may utilize the guide structure 23, the retaining structure 41, and the drill bit carrier 42 as shown in FIGS. 2 and 2A. The drilling device 50 (FIGS. 5-5D), 60 (FIGS. 6-6A), 70 (FIGS. 7-7C), 80, or 90 (FIGS. 8-9) may be used as a portable unit compared to the drilling device 20, a table mount unit. The table mount unit (drilling device 20) may be set forth as a stationary unit to which a workpiece may brought, meanwhile the portable units (drilling devices 50, 60 and 70) may be movable to and used onto the workpiece that may be stationary.

The drilling device 70 may comprise: a base 71 disposed at one end of a guide structure 72; the guide structure 72 disposed in between the base 71 and the guide carrier 73; the guide carrier 73 having a front surface 731 urging a workpiece 701; a retaining structure 74 disposed at the guide carrier 73 to retain a drill bit carrier 75 (hereinafter "drill carrier"); a plurality of anti-skid structures 76A, 76B and 76C shown as anti-skid pins disposed at the guide carrier 73, at detachably mounted end stops 712 and at one end of the rigid bars 721, respectively; a gauging structure 77 having indicia indicating workpiece thickness; and a handle 79 on which a user's hand may exert pressure to secure the drilling device 70 on workpiece during drilling a pocket hole since the anti-skid structures 76A, 76B and/or 76C prevent the drilling device 70 from skewing.

FIGS. 7-7B show that the drilling device 70 may be capable of drilling pocket holes 704a and 704b in a joist 701 with or without a deck board 705 assembled thereon. FIG. 7 shows the pocket hole 704c drilled with and by aid of the end stop 712 that is mounted on the base 71. The base 71 may have an auxiliary surface 711 and the end stop 712 may be detachably mounted via a screw 715. The longitudinal direction of the pocket hole 704c is not perpendicular to the end face 703 since each rigid rod 721 is independently adjustable with respect to the guide carrier 73, wherein each line stop 713 formed in the end stop 712 urges the end face 703. Thus the device 70 may be able to drill even non-perpendicular pocket holes 704a-704c with respect to the end face 703. More details for the base 71 are shown in FIG. 7B.

FIG. 7A shows that the pocket hole 704a can be drilled where the deck board 705 is already assembled to the joist 701, alike repairing squeaky floors, which can be performed after removal of the end stop 712. Use of the drilling device 70 may be as follows: grasp the device 70 by the handle 79; tilt this counter clockwise while the anti-skid-structures 76A are above the front face 702; push this toward the extended end face 706 until the apex pin 76C engages the board 705 while the auxiliary surface 711 is in contact on the board 705; tilt this clockwise and apply pressure from the handle 79; and drive the drill bit 17 until the pocket hole 704 is drilled.

Securing the drilling device 70 on the workpiece with a force via handle 79 may be achieved by the apex pins 76A for the longitudinal and lateral directions, and by the apex pins 76B and/or 76C for the lateral and transverse directions.

A provision of relatively long and laterally disposed two parallel bores formed in a drill bit carrier 75 that slidably engages on rigid bars 741 may eliminate use of a bushing disposed in the guide carrier 73 as seen in FIG. 7A. A step collar 751 is mounted on the drill bit 17 and yet adjustable in the axial or drilling direction. Each end of rigid bars 741 may have an annular groove with taper 742 for the drill carrier 75 not to derail by a hairpin clip 743 that is held in notches 754, which enables the drill carrier 75 to retain in the rigid bars 741. The engagement of the hairpin clip on the rigid bar 741 is shown as a double-dotted line, 743', and that on the annular groove 742 is shown as solid line 743 in FIG. 7C. The handle 79 may have a slot 791 through which a screw 792 may fasten to the guide carrier 73.

Screws used in the pocket holes for joining structural lumbers (2×4-38.1 mm×88.9 mm, 2×6-38.1 mm×139.7 mm and so on) are 2½ inch (63.5 mm) in length and the maximum size is #8. Joining structural lumbers assemblies that are subject to a high load may require using larger diameter screws, which demands use of corresponding pocket drill bits. The diametric dimensions of commercial pocket drill bit and that of the step drill is ⅜ inch (9.5 mm) and about 0.164 inch (4.2 mm), respectively, which is anticipated to use #6-#8 screws. Often the #6-#8 wood screw shank underneath the head gets sheared off when a screw whose length is over 1.5 inch (38.1 mm) is driven into wood. The torsional and shear strength of ¼ inch (6.3 mm) or #14 screw is about 6.9 times and 3.6 times stronger, respectively, than that of #8, 0.131 inch (3.3 mm) screw, which may allow one #14 screw to replace three #8 screws, wherein further savings are apparent from drilling and assembly labors.

Therefore, it is found in practice that use of larger than #6-#8 screws such as #10, #12 and #14 are to overcome the problem, which requires a drill bit 17 whose diametric dimension should be at least ⁷⁄₁₆ inch (11.1 mm) and at least 0.188 inch (4.7 mm) for its pocket drill and step drill portion, respectively, to use the #10 screws. The drill bit 17 as shown in FIGS. 7 and 7A has diametric dimensions of the pocket drill ⅝ inch (15.9 mm) and that of the step drill is ¼ inch (6.3 mm). A proper sizes of diametric dimension for the pocket drill bit are ⁷⁄₁₆ (11.1 mm) and ⅝ inch (15.9 mm) for the #10 and #14 screws, respectively. The screw 171 may have an auger point, flanged hex head and radially disposed knurls there in between.

A nut setter or screwdriver 172 may comprise a shank 175, a magnet 174 near hex socket 173 that engage with hex head of a #14 screw 171. The diameter near the hex socket 173 is substantially smaller than that of pocket hole 704b. Conventional screwdrivers used for driving pocket screws comprise a hex shank 178d, an annular groove 178e, and a square tip 177. Often the screw held in the square tip 177 drops by gravity, which may be improved by having a magnet imbedded in between the shank 178c and the square bit tip 177, but the outer diameter of the socket 178a, as shown in FIG. 7D, is smaller than ⅜ inch (9.5 mm) otherwise the socket 178a cannot be used for the conventional ⅜ inch (9.5 mm) pocket holes.

It is found through experiments that the clamping force requirement exerted to the guide carrier 73 on the workpiece to prevent it from skewing from the workpiece while drilling the workpiece with the pocket drill bit 17 whose diameter is ⅜ inch (9.5 mm) is about 60 lbs (27 Kgf) with four anti-skid structures 76A protruded about 0.10 inch (2.5 mm) from the front surface 731, wherein each #8 setscrew is modified for the anti-skid structures 76A to have a right circular cone whose apex angle is about 30 degrees; about 85 lbs (37 Kgf) with a double-sided sandpaper whose grit size is 150 in between them; about 220 lbs (100 Kgf) without any other medium placed in between them. The surface material of the guide carrier 73 used for this experiment is glass-filled nylon and that of the workpiece is sanded oak wood. Thus the clamping force is substantially reduced with the friction means compared to smooth contact surfaces.

Thus the provision of the anti-skid structures 76A at the guide carrier 73 and the 60 lbs (27 Kgf) force exerted on the guide carrier by a user can successfully drill the workpiece, which has apparent savings from clamping and unclamping time. The anti-skid structures such as 76A are also shown in the drilling devices 20, 50 and 70. FIGS. 2 and 2A show anti-skid pads 274, 275 and 276 that urge workpiece for the purpose set forth and may be constructed by thermoplastic elastomeric material, frictional material including sandpaper, knurled metal surface, cone point screw or (apex) pin, although the embodiments are not so limited.

The various components set forth can be made from any suitable material. In particular, the base 21, the clamp 27, the yoke 29, the amplifier 30, the drill carriers 42, 44, 45A and 48, the base 51, the guide structure 52, the guide carriers 53 and 73, the drill carrier 55 and 65, the handle assembly 59, the input structure 67, and so forth, shown in FIG. 1-7D, may each be made from any suitable material or any combination of materials, such as any type of plastic and any type of ferrous or non-ferrous metal. Those components may be made of any suitable construction, such as a plastic injection molding, a plastic extrusion, an aluminum extrusion or casting. The guide carriers 53 and 73 may be made of a 6105-T5 or T6 extruded aluminum followed by machining because of its high tensile strength, dimensional stability and ability to dissipate heat more effectively than most other materials, wherein the heat is caused by the rotating drill bit during drilling.

The invention claimed is:

1. A device for drilling pocket holes in a workpiece comprising:
   a guide carrier having a slant bore for receiving a drill bit which defines a drilling direction;
   a front surface disposed at the guide carrier and urging a workpiece;
   a step collar mounted on a shank of the drill bit, which is slidable from a pre-drilling position to a post-drilled position toward and away from the guide carrier;
   a retaining structure disposed at the guide carrier to keep the step collar at the pre-drilling position;
   a drill bit carrier slidably connected to the retaining structure;
   wherein the step collar mounted to the shank of the drill bit is held within the drill bit carrier;
   wherein the step collar is held within the drill bit carrier by a step of the step collar and a stop collar mounted on the drill bit.

2. A device of claim 1, wherein the retaining structure comprises at least one of a rigid bar, a L-shaped flat spring, an arched flat spring, a snap spring or a compression spring.

3. A device of claim 2, further comprising a drill bit carrier in which the step collar is rotatably coupled and axially retained.

4. A device of claim 1, further comprising a base on which a guide structure is mounted so that the guide carrier can slide on the guide structure in a longitudinal direction and can select its position with respect to an end stop which engages an end face in the workpiece.

5. A device of claim 1, further comprising at least one rigid guide bar which has a first end on where the guide carrier is slidably mounted in a longitudinal direction and a second end on where an end stop is mounted so that the guide carrier can select its position with respect to the end stop which has a relationship with an end face off the workpiece.

6. A device of claim 1, further comprising indicia disposed on the retaining structure, which indicate workpiece thickness.

7. A device of claim 1, wherein the drill bit comprises a step drill, a shank and a pocket drill formed in-between, wherein the step drill and a portion of the pocket drill are made of more wear-resistant material than that of the shank material.

8. A device of claim 1, wherein the diameter of the bore is at least 7/16 inch (11.1 mm).

9. A device of claim 1, wherein the drill bit comprises a step drill, a shank and a pocket drill formed in-between, wherein the step drill and a portion of the pocket drill are made of more wear-resistant material than that of the shank material.

10. A device for drilling pocket holes in a workpiece comprising:
    a base having an end stop engaging an end face of the workpiece;
    a guide carrier disposed at the base having a front surface urging a front face of the workpiece, wherein the front face is perpendicular to the end stop;
    at least one slant bore disposed at the guide carrier for receiving a drill bit;
    a clamp disposed on the base to move in a transverse direction;
    a step collar mounted on a shank of the drill bit, which is slidable from a pre-drilling position to a post-drilled position toward and away from the guide carrier;
    a retaining structure mounted on the guide carrier to keep the step collar at the pre-drilling position;
    a drill bit carrier slidably mounted to the retaining structure;
    wherein the drill bit carrier is kept at a pre-drilling position by a leaf or flat spring which is connected to the retaining structure and engages and holds the drill bit carrier by a rest bend.

11. A device of claim 10, further comprising a drill bit carrier in which the step collar is rotatably coupled and axially retained, wherein the drill bit carrier is guided by the retaining structure.

12. A device of claim 10, further comprising a braking lever for quick positioning of the clamp which is slidable on the base.

13. A device of claim 10, further comprising at least one lateral stop structure disposed at least one of the clamp, guide carrier or base so as to set a lateral position of the pocket hole from a side face of workpiece.

14. A device of claim 10, further comprising a lateral opening and a hose adapter secured therein, wherein the lateral opening communicates with the slant bore to remove waste material generated from workpiece drilling.

15. A device of claim 14, further comprising a waste material remover having a blower, a motor to turn the blower and a sensor, wherein the sensor activates the blower when the sensor senses drill motor driving the drill bit is turned on.

16. A device of claim 10, further comprising a guide structure disposed on the base, wherein the guide carrier slidably mounted on the guide structure in a longitudinal direction.

17. A device of claim 16, further comprising indicia indicating workpiece thickness, which are disposed on at least one of the guide carrier, the guide structure or gauging structure.

18. A device for drilling pocket holes in a workpiece comprising:
    a base having an end stop engaging an end face of the workpiece;
    a guide carrier disposed at the base having a front surface urging the workpiece;
    at least one slant bore disposed at the guide carrier for receiving a drill bit;
    a clamp to urge the workpiece;
    an amplifier operated by a user's power to generate a higher output force for the clamp to clamp or to unclamp the workpiece;
    a cable connected on a first end to the amplifier and connected on a second end to a yoke;
    wherein the yoke is operatively connected to the clamp;
    wherein the amplifier is disposed away from the base by the cable;
    wherein the amplifier has a lever connected to the cable such that when the lever is pressed the clamp is actuated;
    wherein the amplifier is operatively connected to the yoke by the cable;
    wherein when the amplifier is actuated the yoke adjusts the clamp for workpiece thickness;
    wherein the yoke has a second lever that adjusts the position of the clamp.

19. A device of claim 18 wherein the amplifier comprises two dissimilar bore sized cylinders and a tube which holds fluid.

20. A device for drilling pocket holes in a workpiece comprising:

a guide carrier having a slant bore for receiving a drill bit;
a front surface disposed at the guide carrier and urging a workpiece; and
at least one anti-skid structure disposed at the front surface to secure the guide carrier with respect to the workpiece during drilling;
wherein the at least one anti-skid structure is adjustable;
wherein the at least one anti-skid structure is threadably engaged in the guide carrier.

21. A device of claim 20, wherein the anti-skid structure has a front surface that includes at least one of a pin, a cone point screw, a knurled metal surface, a sandpaper surface or an elastomeric material surface.

22. The device of claim 1 wherein the step collar and the stop collar are mounted to the shank of the drill bit by a set screw.

23. The device of claim 1 wherein the step collar and the stop collar are positioned on opposite sides of the drill bit carrier, thereby lockingly engaging the drill bit to the drill bit carrier.

* * * * *